United States Patent [19]

Abe

[11] 4,060,142
[45] Nov. 29, 1977

[54] ENVIRONMENTAL NOISE POLLUTION REDUCTION DEVICE OF RUNNING ROAD VEHICLE

[75] Inventor: Eiichi Abe, Yokohama, Japan

[73] Assignee: Nissan Motor Company, Limited, Yokohama, Japan

[21] Appl. No.: 633,419

[22] Filed: Nov. 19, 1975

[30] Foreign Application Priority Data

Nov. 20, 1974 Japan .......................... 49-139551[U]
June 5, 1975 Japan ............................ 50-76601[U]

[51] Int. Cl.² ............................................. B62D 25/08
[52] U.S. Cl. ................................... 180/54 A; 181/204
[58] Field of Search .................. 181/33 K; 180/54 R, 180/54 S, 69.1, 69 R, 69 C, 64 R, 64 A

[56] References Cited

U.S. PATENT DOCUMENTS

| 3,882,951 | 5/1975 | Conley ........................... 181/33 K X |
| 3,884,322 | 5/1975 | Nemschoff ..................... 180/69 R X |
| 3,918,541 | 11/1975 | Krieger ............................... 180/69 R |

FOREIGN PATENT DOCUMENTS

| 741,977 | 12/1932 | France ............................. 180/69 R |
| 873,659 | 4/1953 | Germany ........................... 181/33 K |
| 881,661 | 7/1953 | Germany .......................... 180/54 A |

*Primary Examiner*—Joseph F. Peters, Jr.
*Assistant Examiner*—Milton L. Smith

[57] ABSTRACT

Engine noises directed to the bottom portion of an engine compartment are reflected from the surface of an under-cover partly closing the engine compartment bottom opening and thereafter absorbed by sound-absorbent material attached to the inner surface of the hood of the engine compartment.

8 Claims, 10 Drawing Figures

ENVIRONMENTAL NOISE POLLUTION REDUCTION DEVICE OF RUNNING ROAD VEHICLE

This invention relates to an automobile body equipped with a device for reducing the environmental noise pollution generated by a running engine.

Automobiles have been felt by some to be major contributors to noise pollution in today's urban areas. Of the noises arising from the automobile, noise generated by the engine contributes to a considerable extent to automobile exterior noise. The noise generated by the engine is firstly distributed within the engine compartment and thereafter reflected via various routes to the exterior of the automobile body. As a result of researches, this inventor found and paid attention to the fact that reducing the engine noise emitted through an opening formed at the bottom portion of the engine compartment is remarkedly effective on overall reduction of automobile exterior noise caused by the running engine.

It is therefore a principal object of the present invention to provide an improved automobile body for reduction of the automobile exterior noise.

Another object of the present invention is to provide an improved automobile body for reducing the engine noise emitted to the environment through an opening formed at the bottom portion of the engine compartment.

A further object of the present invention is to provide an improved automobile body in which under-cover means is supplied for partly closing the opening formed at the bottom portion of the engine compartment and sound-absorbent material is supplied to the inner surface of the hood of the engine compartment, whereby the engine noise directed to the bottom portion of the engine compartment is reflected from the surface of the under-cover means and thereafter absorbed by the sound-absorbent material.

Other objects and features of the improved automobile body in accordance with the principle of the present invention will become more apparent from the following description taken in conjunction with the accompanying drawings in which like reference numerals and characters designate corresponding parts and elements, and in which.

Figure 1:
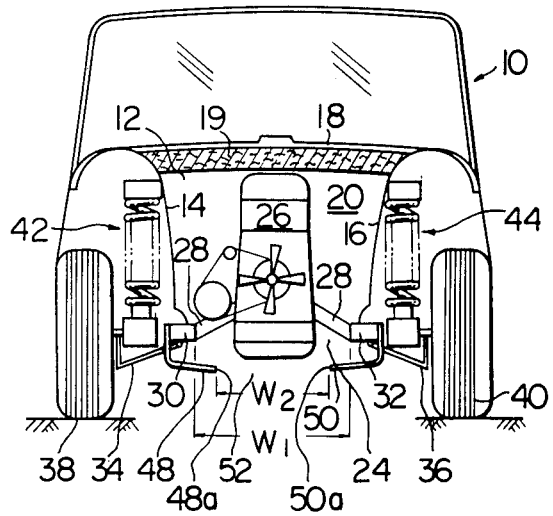
FIG. 1 is a schematic sectional front elevation illustrating an engine compartment of an automobile equipped with an under-cover according to the present invention.
Figure 2:
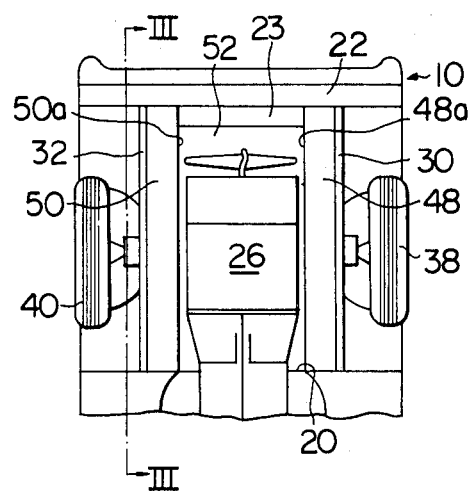
FIG. 2 is a schematic plan view showing the engine compartment of FIG. 1.
Figure 3:
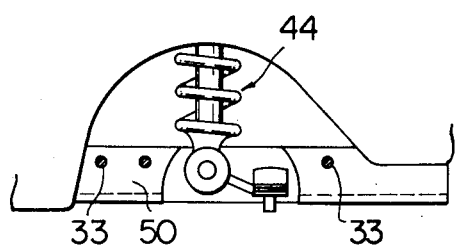
FIG. 3 is an enlarged side view taken on line III—III of FIG. 2.

Referring now to FIGS. 1, 2 and 3, there is shown a preferred embodiment in accordance with the principle of the present invention in which an automobile or a road vehicle body 10 has an engine compartment 12 at its front portion with respect to the normal cruising direction. The engine compartment 12 is enclosed and defined by two opposed hood ridges or side panels 14 and 16, a hood 18 spanning between the top portions of the side panels 14 and 16 and equipped with sound-absorbent material 19 attached to the inner surface of the hood, a fire-wall 20 separating a passenger compartment (not shown) from the engine compartment 12, and a front wall 22 oppositely disposed to the fire-wall and having therethrough openings for inducting cooling air. Adjacent to the front wall is a radiator 23 for cooling an engine coolant fed therethrough. The engine compartment 12 has at its bottom portion a generally rectangular opening 24 in plan as best seen in FIG. 2.

As shown, an internal combustion engine 26 is disposed within the engine compartment 12 and mounted through engine mounts 28 on two opposed side members of engine supporting rigid elongate members 30 and 32. The side members 30 and 32 extend from the front wall 22 toward the fire-wall 20 and are respectively attached to the lower portions of the panels 14 and 16. The side members 30 and 32 are respectively connected through suspension arms 34 and 36 to front wheels 38 and 40 which are respectively in turn connected to front suspension elements 42 and 44.

Attached respectively to the side members 30 and 32 are first and second under-covers 48 and 50 which have a generally elongate rectangular shape in plan and are generally of the same size. The first and second under-covers 48 and 50 are secured to the outer sides of the respective side members 30 and 32 by suitable fastening means 33 such as bolts as clearly shown in FIG. 3 and extend along the side members 30 and 32. The opposed edges 48a and 50a of the first and second under-covers are separated from each other by a generally rectangular ventilation opening 52 therebetween. It is to be noted that the bottom portion of the engine 26 is substantially spaced apart from the plane (not identified) of the rectangular ventilation opening 52 and substantially closer to the hood 18 than the plane of the rectangular ventilation opening 52 to provide a cooling air passage leading to the opening 52. The width $W_2$ of the opening 52 defined between the opposed edges 48a and 50a is preferably in the range of 60 to 75% of the width $W_1$ of the opening 24 defined between the opposed sides of the side members 30 and 32, however, it is more preferable that the width $W_2$ is approximately $\frac{2}{3}$ of the width $W_1$.

Figure 4A:
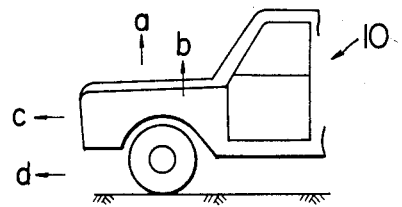
FIGS. 4A and 4B are schematic representations showing the routes along which engine noises are emitted from the engine compartment.
Figure 4B:
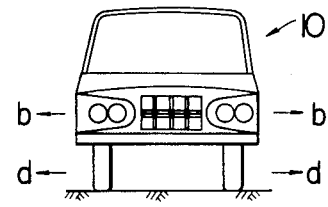
Figure 5:
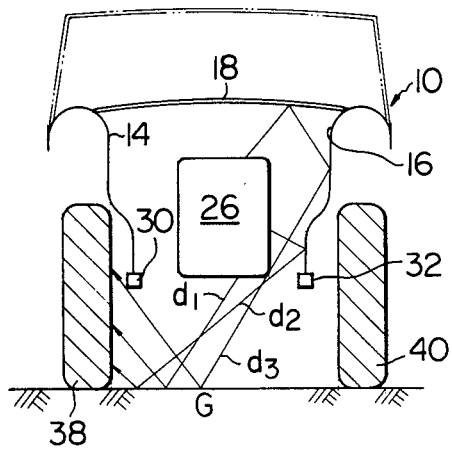
FIG. 5 is a schematic representation showing the paths along which the engine noises are emitted to the exterior of the engine compartment through the opening formed at the bottom portion of the engine compartment.
Figure 6:
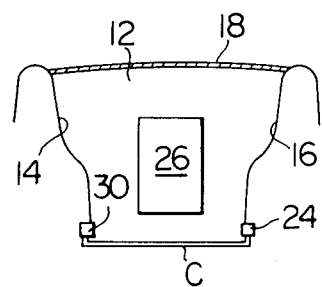
FIG. 6 is a schematic representation showing an automobile body supplied with an imaginary under-cover C at the bottom portion of the engine compartment.

The principle of the present invention has been established on the basis hereinafter discussed. Referring to FIGS. 4A, 4B, 5, 6 and 7, engine noises from the engine compartment seem to be emitted outside of the automobile body 10 via the four routes a, b, c and d as shown in FIGS. 4A and 4B. The order of contributing to emission of automobile exterior noise is $d > c > a > b$ and therefore it will be understood that the total automobile noise can be noticeably decreased by decreasing the noise emitted via the route d. The noise via the route d seems to travel from the engine 26 to the enrivonment of the body 10 along three paths $d_1$, $d_2$ and $d_3$, in which the engine noise along the path $d_1$ directly travels toward the ground G and is reflected from the surface of the ground, whereas the noises along the paths $d_2$ and $d_3$ are at least once reflected from the surfaces of the members enclosing the engine compartment 12 toward the ground G to be further reflected. In view of this fact, it will be considered advantageous to provide a cover C for closing the opening 24 formed at the bottom portion of the engine compartment 12 in order to prevent the emission of the engine noises along the paths $d_1$ to $d_3$. This cover C will effectively reduce noise, however, result in the serious problem that the outlet opening for the radiator cooling air is closed and therefore the cooling air quantity passing through the radiator is greatly decreased. This will apparently result in overheating of the engine 26. In this regard, it is preferable to make the cover C as small in area as possible.

Figure 7:
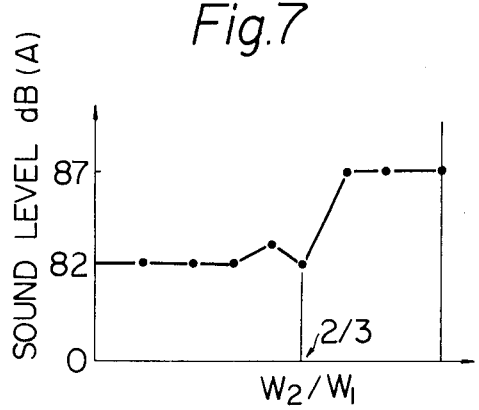
FIG. 7 is a graph showing the relationship between the widths of a rectangular ventilation opening formed through the under-cover according to the present invention and sound levels emitted to the environment through the ventilation opening.

In view of the above, according to the present invention, the opening 24 at the bottom portion of the engine compartment 12 is partly closed with the under-covers having the ventilation opening 52 which allows the cooling air to flow therethrough. As described before, if the opening 24 and the ventilation opening 52 are both of the rectangular shape, the width $W_2$ of the ventilation opening 52 is in the range of 60 to 75% of the width $W_1$ of the opening 24. This range has been experimentally determined as follows: As illustrated in FIG. 7, the sound level dB(A) of the noise emitted from the ventilation opening 52 is kept constantly relatively low up to the upper limit; the sufficient cooling effect of the radiator is obtained with at least the lower limit. When the value of $W_2/W_1$ is approximately ⅔, better effect is obtained on both the noise reduction and radiator cooling.

As discussed above, the engine noise emitted along the route d shown in FIGS. 4A and 4B, is reflected from the inner surfaces of the under-covers and directed to the upper portion of the engine compartment 12 to reach the inner surface of the hood 18. In this connection, according to the present invention, sound-absorbent material such as glass wool is attached to the inner surface of the hood 18 to absorb the noise reflected from the under covers 48 and 50.

It will be understood that since the major portion of the engine noise emitted from the bottom portion of the engine compartment is reflected to the upper portion of the engine compartment and thereafter absorbed by the sound-absorbent material attached to the inner surface of the hood, high engine noise emission is prevented to the outside of the engine compartment and therefore the noise level is markedly reduced.

Figure 8:
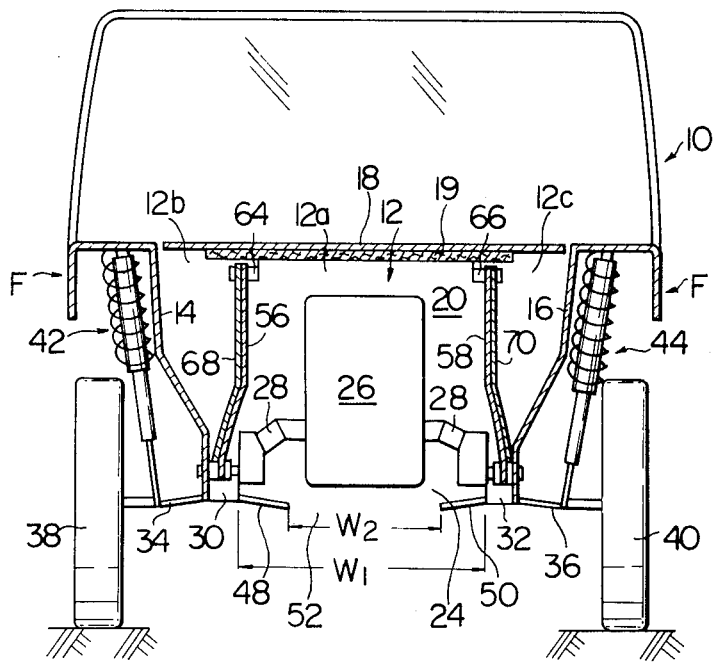
FIG. 8 is a schematic sectional elevation illustrating another engine compartment similar to that of FIG. 1 except for two partition walls disposed within the engine compartment.
Figure 9:
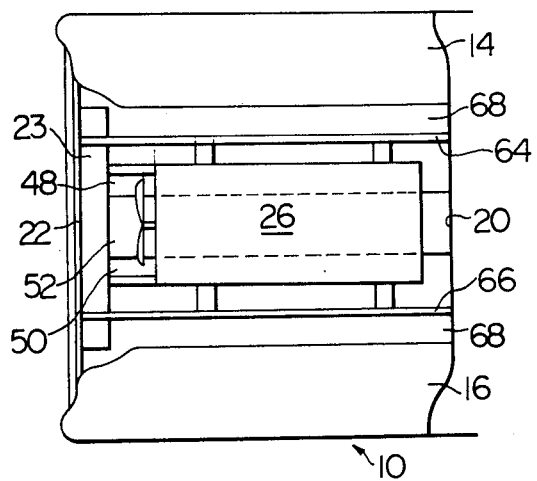
FIG. 9 is a schematic plan view showing the engine compartment of FIG. 8.
Figure 10:
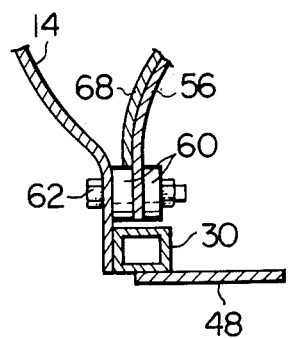
FIG. 10 is an enlarged sectional elevation showing the connection between the lower portion of one of the partition walls and the lower portion of side panels of the engine compartment.

FIGS. 8, 9 and 10 illustrate another preferred embodiment in accordance with the principle of the present invention in which there is shown an automobile body similar to that shown in FIG. 1 except for two opposed partition walls 56 and 58 disposed within the engine compartment 12. The partition walls 56 and 58 are respectively fastened at their lower portions through insulating rubber pieces 60 to the lower portions of the hood ridges 14 and 16 by bolts 62 as best seen in FIG. 10. The lower portions of the partition walls may be alternatively fastened to the side members 30 and 32. The upper portions of the partition walls 56 and 58 are respectively fastened to two opposed elongate members 64 and 66 which are disposed adjacent the inner surface of the hood 18. The elongate members are spaced from each other and connected between the front wall 22 and the fire-wall 20 as clearly shown in FIG. 9. The partition walls 56 and 58 extend from the front wall 22 to the fire-wall 20 and divide the engine compartment 12 into a central compartment 12a in which the engine 26 is disposed, and two opposed side compartments 12b and 12c facing the respective side panels 14 and 16. The partition walls are respectively covered with heat resistant sound-absorbent material sheets 68 and 70 such as glass wool sheets attached on their surfaces facing the side compartments 12b and 12c.

With the construction mentioned above, the engine noises otherwise traveling through the walls of the side panels 14 and 16 are blocked by the partition walls 56 and 58 and therefore the engine noise emitted through the fender portions F of the automobile body 10 is remarkably reduced. This noise reduction effect greatly contributes to automobile exterior noise reduction in addition to the above discussed noise reduction effect of the under-covers 48 and 50 and the sound-absorbent material 19 attached to the inner surface of the hood 18.

What is claimed is:

1. In a road vehicle body including an engine compartment in which an engine is disposed, the engine compartment being defined by two opposite longitudinal side panels, a hood spanning between the top portions of the side panels, a fire-wall separating a passenger compartment from the engine compartment, and a front wall oppositely disposed to the fire-wall and having therethrough openings for inducting cooling air, the engine compartment having at its bottom portion a generally rectangular opening in plan, the improvement comprising:

first and second under-covers which are of generally elongate rectangular shape in plan and generally of the same size for partly covering the rectangular opening to reflect the engine noise, said first and second under-covers being oppositely disposed longitudinally along the bottom portions of the side panels and extending from the front wall to the fire-wall, the opposed edges of said first and second under-covers being separated from each other by a rectangular ventilation opening therebetween, the bottom portion of the engine being substantially spaced apart from the plane of the rectangular ventilation opening and substantially closer to the hood than the plane of the rectangular ventilation opening, said first and second under-covers being respectively secured to two opposite rigid side members which extend from the front wall toward the fire-wall and are attached to the bottom portions of the side panels, the engine being mounted on the side members, the width of said rectangular ventilation opening defined between the opposed edges of the under-covers being in the range of 60 to 75% of the width of said rectangular opening defined between the opposed inner sides of the side members; and sound absorbent material attached to the inner surface of the hood for absorbing the noise reflected by the under-covers into the engine compartment.

2. The improvement as claimed in claim 1, in which said sound-absorbent material is glass wool.

3. The improvement as claimed in claim 1, in which the width of said rectangular ventilation opening is substantially ⅔ of the width of said rectangular opening.

4. The improvement as claimed in claim 1, further comprising two opposed side partition walls which are secured at their lower portions to the lower portions of the respective side panels, and at their upper portions to a member disposed adjacent to the inner surface of the hood, the partition walls extending from the front wall to the fire-wall and dividing the engine compartment into a central compartment in which the engine is disposed, and two opposed side compartments which are respectively facing the side panels.

5. The improvement as claimed in claim 4, in which said member disposed adjacent to the inner surface of the hood includes two opposed elongate members which are spaced apart from each other and connect between the front wall and the fire-wall, the upper portions of said partition walls being secured to the respective elongate members.

6. The improvement as claimed in claim 4, in which said two partition walls are respectively secured through insulating rubber pieces to the side panels by fastening means.

7. The improvement as claimed in claim 4, further comprising sound-absorbent material attached to the respective surfaces of the partition walls facing the side compartments.

8. The improvement as claimed in claim 7, in which said sound-absorbent material is glass wool.

* * * * *